US007975888B2

(12) United States Patent
Settelmayer

(10) Patent No.: US 7,975,888 B2
(45) Date of Patent: Jul. 12, 2011

(54) REAR-MOUNTED BICYCLE CARRIER WITH STABILIZING STRUCTURES

(75) Inventor: Joseph J. Settelmayer, Fieldbrook, CA (US)

(73) Assignee: Yakima Products, Inc., Beaverton, OR (US)

( * ) Notice: Subject to any disclaimer, the term of this patent is extended or adjusted under 35 U.S.C. 154(b) by 59 days.

(21) Appl. No.: 11/198,891

(22) Filed: Aug. 4, 2005

(65) Prior Publication Data

US 2006/0032879 A1    Feb. 16, 2006

Related U.S. Application Data

(60) Provisional application No. 60/601,504, filed on Aug. 12, 2004.

(51) Int. Cl.
*B60R 9/00* (2006.01)
*B60R 11/00* (2006.01)

(52) U.S. Cl. ........ 224/497; 224/492; 224/493; 224/502; 224/505; 224/506; 224/507; 224/531; 224/532; 224/314

(58) Field of Classification Search ............ 224/497, 224/324, 314, 532, 534, 537, 924, 492, 493, 224/502, 505, 506, 507, 531; 248/292.12
See application file for complete search history.

(56) References Cited

U.S. PATENT DOCUMENTS

| | | | | |
|---|---|---|---|---|
| 5,056,700 A | * | 10/1991 | Blackburn et al. | 224/324 |
| 5,135,145 A | * | 8/1992 | Hannes et al. | 224/493 |
| D346,995 S | * | 5/1994 | Thulin | D12/408 |
| 5,720,399 A | * | 2/1998 | Kohlhaas | 211/133.1 |
| D412,482 S | * | 8/1999 | Chen | D12/408 |
| D447,997 S | * | 9/2001 | Ferman et al. | D12/408 |
| 6,286,738 B1 | * | 9/2001 | Robins et al. | 224/314 |
| 7,118,016 B1 | * | 10/2006 | Kolda | 224/500 |

* cited by examiner

*Primary Examiner* — Justin M Larson
*Assistant Examiner* — Lester L Vanterpool
(74) *Attorney, Agent, or Firm* — Kolisch Hartwell, P.C.

(57) ABSTRACT

A bicycle carrier configured to be mounted to a rear of a vehicle is disclosed. The bicycle carrier includes a first support frame structure having a base portion disposed between a pair of support arms configured to carry one or more bicycles, the base portion being configured to contact an upper region of the rear of the vehicle, where the base portion is wider than the distance between the support arms; a second support frame structure having a base portion configured to contact a lower region of the rear of the vehicle; and at least one hub assembly operatively connecting the first and second support frame structures and permitting selective pivoting of one support frame structure relative to the other frame structure.

4 Claims, 4 Drawing Sheets

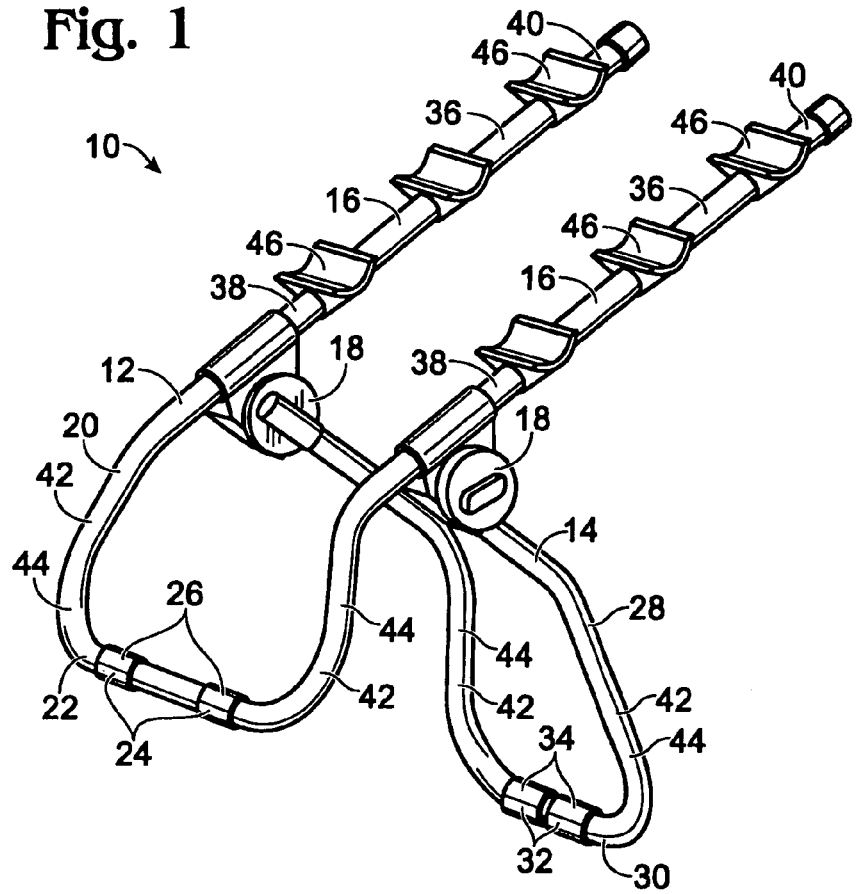
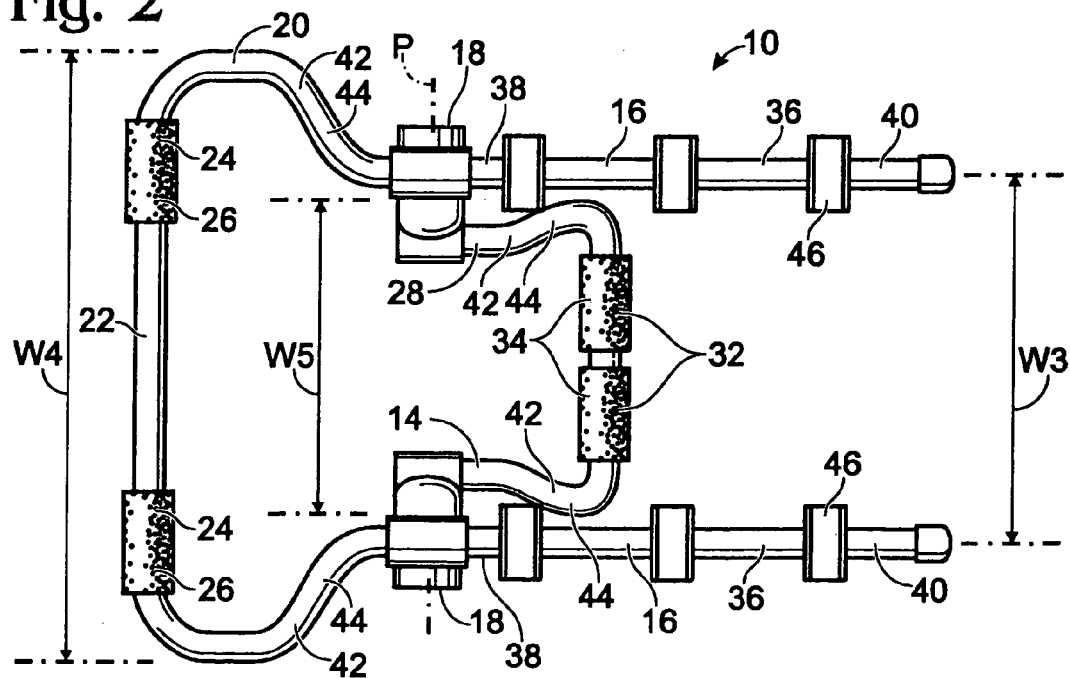

REAR-MOUNTED BICYCLE CARRIER WITH STABILIZING STRUCTURES

CROSS-REFERENCE TO RELATED APPLICATIONS

This application claims priority under 35 U.S.C. §119(e) to U.S. Provisional Patent Application Ser. No. 60/601,504 entitled "Rear-Mounted Bicycle Carrier with Stabilizing Structures," filed Aug. 12, 2004, the complete disclosure of which is hereby incorporated by reference for all purposes.

BACKGROUND OF THE DISCLOSURE

The popularity of recreational cycling has grown substantially in recent years. As a result, the demand for bicycle carriers to transport bikes on cars and other vehicles also has grown. There are various types of vehicle-mounted bicycle carriers available. One type is mountable on the trunk or other rear portion of a vehicle to carry one or more bicycles adjacent the rear of the vehicle. Typically, those carriers include support arms to support one or more bicycles. A problem with some of the rear-mounted carriers, however, is that the support arms of those carriers are too far apart to accommodate certain types of bicycles, such as children's bicycles and bicycles with unusual frame structures.

Reducing the size of the rear-mounted carrier may bring the support arms closer and allow that carrier to accommodate more types of bicycles. Smaller carriers are, however, less stable than their larger counterparts. Reduced stability may cause the carriers to sway or become misaligned while maneuvering the vehicle possibly resulting in damage to the bikes and/or the vehicle.

SUMMARY OF THE DISCLOSURE

Examples of trunk mountable bicycle carriers provide a bicycle carrier configured to be mounted on a rear of a vehicle. A bicycle carrier includes a first support frame structure having a base portion disposed between a pair of support arms configured to carry one or more bicycles. The base portion may be configured to contact an upper region of the rear of the vehicle, where the base portion is wider than the distance between the support arms. A second support frame structure has a base portion configured to contact a lower region of the rear of the vehicle; and at least one hub assembly operatively connecting the first and second support frame structures and permitting selective pivoting of one support frame structure relative to the other frame structure.

BRIEF DESCRIPTION OF THE DRAWINGS

FIG. 1 is an isometric view of a bicycle carrier incorporating stabilizing structures.

FIG. 2 is a top view of the bicycle carrier of FIG. 1.

DETAILED DESCRIPTION

Figure 3:
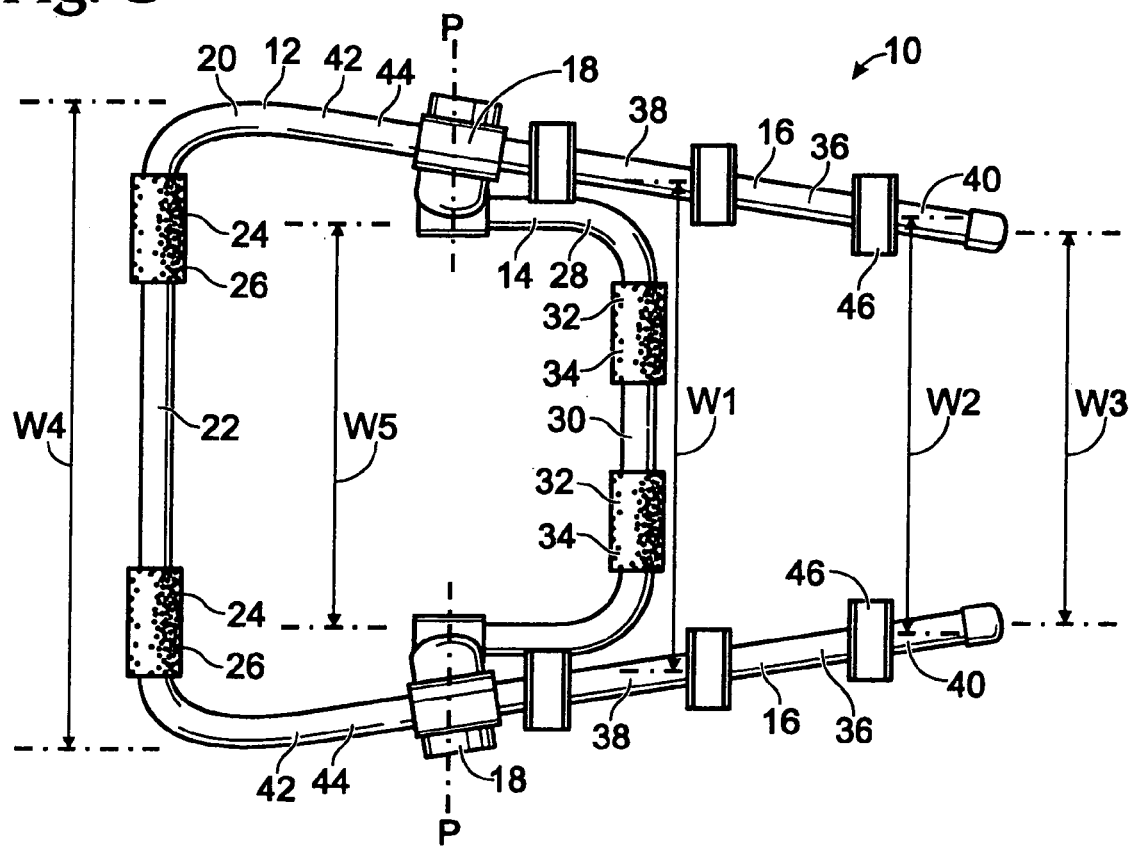
FIG. 3 is a top view of another example of a bicycle carrier incorporating stabilizing structures.

FIGS. 1-2 depict some examples of a bicycle carrier 10. Bicycle carrier 10 may include any suitable structure configured to be mounted to a rear of a vehicle and support one or more bicycles. For example, bicycle carrier 10 may include a first support structure 12, a second support structure 14, a third support structure 16, and at least one hub assembly 18.

First support structure 12 may include any suitable structure configured to be mounted to and/or contact an upper portion of the rear of a vehicle. For example, first support structure 12 may include a first support frame structure 20. The first support frame structure may include a base portion 22 and one or more cushioning elements 24. The base portion may include any suitable structure configured to contact an upper portion of the rear of the vehicle. The cushioning elements may include any suitable structure configured to protect the vehicle and/or the first support frame structure from scratching and/or other damage. For example, cushioning elements 24 may include pads 26.

Second support structure 14 may include any suitable structure configured to be mounted to and/or contact a lower portion of the rear of a vehicle. For example, second support structure 14 may include a second support frame structure 28. The second support frame structure may include a base portion 30 and one or more cushioning elements 32. The base portion may include any suitable structure configured to contact an upper portion of the rear of the vehicle. The cushioning elements may include any suitable structure configured to protect the vehicle and/or the second support frame structure from scratching and/or other damage. For example, cushioning elements 32 may include pads 34.

Although cushioning elements 24 and 32 are shown to include pads 26 and 34, any suitable structure configured to protect the vehicle and/or the first or second support structures from damage may be used. Additionally, although first and second support frame structures 20 and 28 are shown to include a double wishbone form and/or shape, those support frame structures may include any suitable form and/or shape configured to be mounted to the rear of the vehicle.

Third support structure 16 may include any suitable structure configured to support one or more bicycles. For example, the third support structure may include support or carrier arms 36 each having a proximal portion 38 and a distal portion 40. The proximal portion may be adjacent the at least one hub assembly and the distal portion may be spaced from the proximal portion.

The support arms may be configured in any suitable way or form. For example, the support arms may be at least substantially rectilinear. Additionally, or alternatively, support arms 36 may be perpendicular to a pivot axis along which the first, second, and/or third support structure pivots via the at least one hub assembly, as further discussed below. Moreover, the support arms may be parallel to each other or may converge such that a distance between the proximal portions W1 is greater than the a distance between the distal portions W2, as shown in FIG. 3. Furthermore, the support arms may be incorporated with first support structure 12.

Although support arms 36 are shown as a pair of support arms incorporated with first support structure 12 and in the specific configurations in FIGS. 1-3, the support arms may be configured in any suitable way or form configured to support one or more bicycles. For example, more or less support arms may be provided. Additionally, or alternatively, the support arms may be non-parallel, may be curvilinear, may diverge (such that the distance between proximal portions is less than the distance between distal portions), may be incorporated with second support structure 14, and/or may be independent of (or independently pivot relative to) the first and/or second support structures.

Although bicycle carrier 10 is shown to have third support structure 16 incorporated or formed with first support structure 12, the third support structure may be independent of the first and second support structures or may be incorporated or formed with second support structure 14.

At least one hub assembly 18 includes any suitable structure operatively connecting the first, second, and/or third support structures and/or configured to permit selective pivoting of one or more of the first, second, and third support structures relative to the structures and/or the at least one hub assembly. The at least one hub assembly may selectively permit pivoting along a pivot axis P. Examples of suitable hub assemblies are disclosed in U.S. Pat. No. 6,286,738, the complete disclosure of which is hereby incorporated by reference for all purposes.

Although two hub assemblies 18 are shown in FIGS. 1-3, any suitable number of hub assemblies may be used. Additionally, although specific examples of hub assemblies are disclosed in the incorporated patent above, any suitable type of hub assembly configured to permit selective pivoting of one or more of the first, second, and third support structures may be used.

Bicycle carrier 10 also may include one or more stabilizing structures 42, which include any suitable structure configured to stabilize one or more of the first, second, and third support structures and/or the bicycle carrier on the rear of the vehicle. Stabilizing structures may include structures independent of the first, second, and third support structures and/or may include structures formed with or part of one or more of those structures. For example, as shown in FIGS. 1-2, stabilizing structures may include one or more flared sections 44 formed or incorporated with at least one of the first, second, and third support structures.

The term "flared section" or "flared sections" as used herein refers to one or more sections of the first, second, and/or third support structures that expand or open outwardly in any suitable way, shape, and/or form to stabilize one or more of the first, second, and third support structures. The flared sections may provide one or more base portions with a width greater than the distance between support arms 36. The term "distance between support arms" as used herein refers to the distance between corresponding points on the support arms that are equidistant from the rear of the vehicle, the base portion, and/or the hub assemblies.

For example, flared sections 44 flare out towards base portions 22 and 30 in FIGS. 1-3. The distance between support arms is indicated at W3 in FIG. 2, while the widths of base portions 22 and 30 are indicated at W4 and W5, respectively. The flared sections may allow W4 to be greater than, equal to, or less than W3, and/or may allow W5 to be greater than, equal to, or less than W3. Additionally, or alternatively, the flared sections may allow W4 to be greater than, equal to, or less than W5.

As also shown in FIGS. 1-3, starting at a position near hub assemblies 18, flared sections 44 of the first (or upper) support structure 12 may flare out toward (upper) base portion 22. Flared sections 44 may also angle downward toward (upper) base potion 22 relative to arms 36. Arms 36 may also define a first plane, base portion 22 being angled out of the first plane toward second (or lower) support frame structure 28. Base portion 22 may be angled out of the first plane away from arms 36 toward second support frame structure 28.

Referring to FIGS. 1-2, starting at a position near hub assemblies 18, flared sections 44 of the second (or lower) support structure 14 may flare out towards (lower) base portion 30. Flared sections 44 of the structure 14 may angle upward towards base portion 30. Flared sections 44 of the structure 14 may flare upward towards base portion 22 of structure 12.

Although both first and second support structures are shown to include flared sections 44 in FIGS. 1-2, either support structure may be free from flared sections. For example, the second support structure of FIG. 3 is free from any flared section. Alternatively, first support structure may be free from flared sections while second support structure may include one or more flared sections. Additionally, although two flared sections are shown for the first and second support structures, any suitable number of flared sections may be used. Moreover, although flared sections 44 are shown to flare out towards the base portions, the flared sections may flare out towards the at least one hub assembly instead of the base portions. Furthermore, although the width of base portion 22 is shown to be greater than the distance between the support arms, which is shown to be greater than the width of base portion 30, the three widths and/or distances may have any suitable relationship.

Although stabilizing structures 42 are shown to include flared sections 44, the stabilizing structures may include any suitable structure configured to stabilize one or more of the first, second, and third support structures and/or the bicycle carrier on the rear of the vehicle. For example, stabilizing structures 42 may include one or more stabilizing bars (not shown). Those bars may be attached or may be formed integral to first support structure 12 and/or second support structure 14. The stabilizing bars may be any suitable shape and have any suitable width. In some embodiments, the stabilizing bars may increase the width of the base portion of the first and/or second support structure. The stabilizing bars also may include one or more cushioning devices to protect the vehicle and bars from scratching. Additionally, the stabilizing bars may be provided with adjustable structures, such as telescoping bars or the like, configured to allow the user to conform the stabilizer bars to a rear of a particular vehicle.

Turning attention now to FIGS. 4-7, carrier 10 also may include one or more mounting assemblies 46, which may include any suitable structure configured to secure one or more bikes to support arms 36. Each mounting assembly may comprise different components depending on the types of bicycles being carried, the arrangement of the carrier in relation to the vehicle type or configuration. For example, as shown in FIGS. 4-7, mounting assemblies 46 may include a cradle 102, a stabilizer 104, and one or more tie-down members (or straps) 106. It will be appreciated, however, that some or all of the mounting assemblies may omit one or more of these components. As one example, a particular mounting assembly may omit a stabilizer and include only a cradle and tie-down member. As another example, the cradle and/or the stabilizer may be configured to grip a bicycle without the need for a tie-down member.

Figure 5:
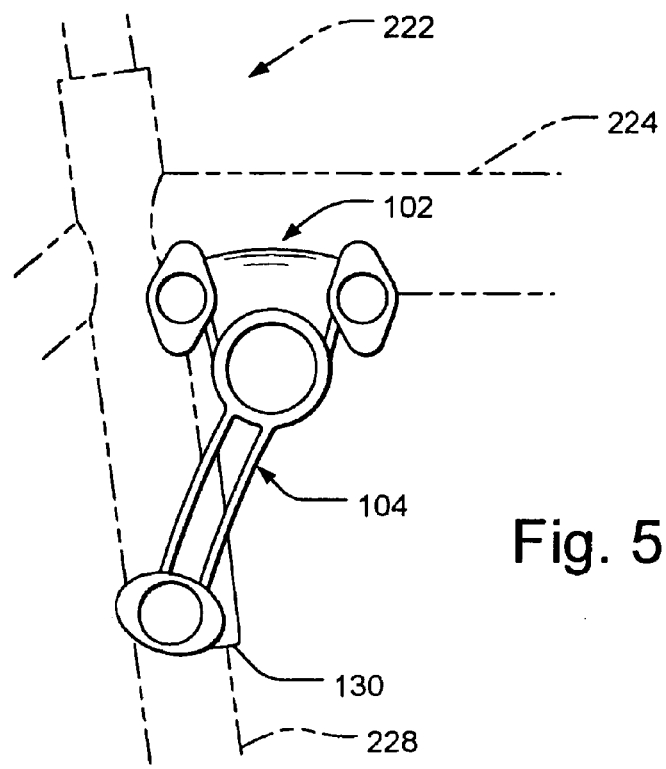
FIG. 5 is a rear elevation of a cradle and a stabilizer showing how the cradle supports a top tube of a bicycle frame, and showing the stabilizer positioned to engage a seat tube of the bicycle frame.
Figure 6:
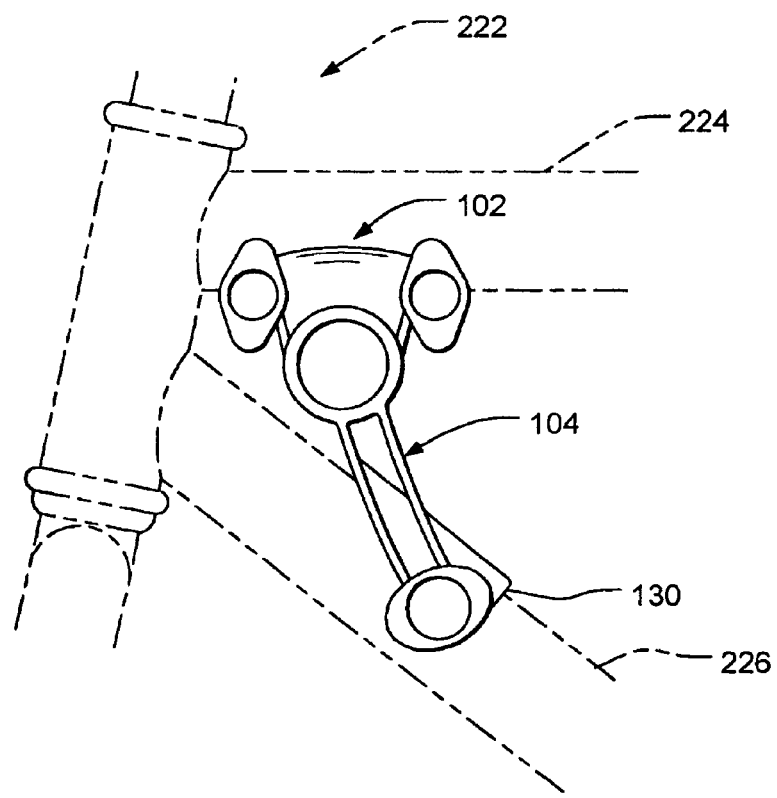
FIG. 6 is a rear elevation of a cradle and a stabilizer showing how a top tube of a bicycle frame is supported by the cradle, and showing the stabilizer positioned to engage the down tube of the bicycle frame.

As is well known in the art, bicycles typically include a frame 222 having a top tube 224, a down tube 226, and a seat tube 228, as shown in FIGS. 5-6. Top tube 224 may extend generally forwardly and horizontally from proximate the bicycle seat to proximate the handle bars. Down tube 226 may be coupled to the top tube proximate the handle bars and extends downwardly and rearwardly toward the pedal sprocket. Seat tube 228 may be coupled to the top tube proximate the seat and extends generally downwardly to the pedal sprocket.

Cradle 102 is disposed on support arm 36 to receive and engage a portion of top tube 224 and retain the bike in a selected longitudinal position on the support arm. As shown in FIG. 1, cradles may be disposed on both support arms and aligned to receive the top tube of a single bike. Thus, the bike may be supported above the ground and retained in a stable position behind the vehicle during travel. The cradle may include a unitary body 108 formed of molded Santoprene rubber or other suitable material adapted to grip the bike frame without causing scratches or other damage.

Body 108 may be formed to define a cylindrical collar 110 adapted to fit over and engage support arm 36, and a channel 112 extending into the body. To install a cradle on a support arm, the user may slide the collar along the support arm to the desired location, and then may rotate the cradle until the channel is aligned in the desired orientation. Typically, channel 112 is oriented above the support arm to allow the top tube of the bicycle to rest in the channel. Channel 112 may be formed as an elongate, parabolic trough adapted to accept top tube 224. The channel may be oriented in a direction generally transverse to collar 110 so that the channel extends generally across the support arms when installed on the rack.

As shown in the illustrative example, the sides of channel 112 may be sized to extend partially up the sides of a top tube resting in the channel. Alternatively, the sides of channel 112 may be larger or smaller as desired. In any event, channel 112 may grip top tube 224 and may retain the bicycle in a stable longitudinal position along the support arm during operation of the vehicle.

To prevent top tube 224 from being dislodged accidentally, one or more tie-down members 106 may be positioned over the top tube and fastened to cradle 102. As shown in the illustrative example, each cradle may include one or more anchors 114 extending from body 108. Anchor 114 may include a circular base 116 that is sized to fit within circular apertures 118 formed in tie-down member 106. Each anchor may have a distal end 120 spaced from body 108, and one or more flanges 122 arranged about the distal end. Flanges 122 may be arranged generally along a single transverse axis A to form an oval or elongate rim. Flanges 122 may prevent the tie down members from slipping off circular base 116. Tie-down members 106 may be made of a stretchable material (e.g. Dynaflex G7431 rubber), and may be stretched along axis A to allow the apertures to pass over the flanges. Thus, the tie-downs member may not accidentally become disengaged from the anchors unless the tie-down members are stretched to clear the flanges.

Figure 7:
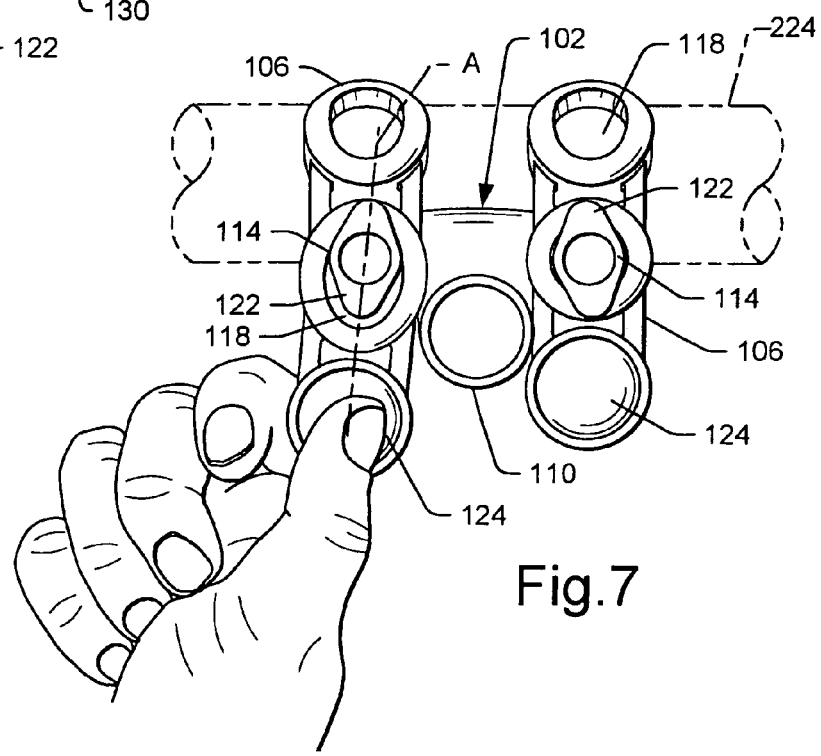
FIG. 7 is a rear elevation of a cradle showing a strap engaged on an anchor, and another strap being stretched to disengage another anchor.

Referring to the tie-down member on the left in FIG. 7, a user may secure the tie-down member to an anchor by hooking one edge of a selected aperture around one flange, and then pulling the tie-down member directly away from the hooked flange (i.e., along axis A). When the tie-down member is pulled along axis A, it will stretch along axis A causing the selected aperture to stretch over the opposite flange. Once the aperture clears the opposite flange, the user may press the tie-down member inward over the flange, and then may release the tie-down member to return to its unstretched condition, illustrated by the tie-down member on the right in FIG. 7. Tie-down member 106 may include a handle or tab 124 to allow the user to grip the tie-down member more easily. The user may disengage the tie-down member by reversing the above steps. In some embodiments, the tie-down members may be formed of a different, more flexible material than the cradles to prevent the anchors from bending when a tie-down member is being stretched over the flanges.

As shown in the illustrative example, each cradle 102 may include two pairs of anchors 114, with one pair disposed adjacent opposite sides of one end of channel 112, and the other pair disposed adjacent opposite sides of the other end of channel 112. Nevertheless, it will be appreciated that other configurations are also within the scope of the invention. For example, a cradle may include less than or more than two pairs of anchors. In addition, it may not be necessary to engage a tie-down member to both pairs of anchors to hold the top tube within the saddle. Similarly, while tie-down members 106 are described above as being separate and removable from cradles 102, an alternative embodiment of the invention may include tie-down members that are formed integrally with the cradles. For example, one end of the tie-down member may extend from adjacent one side of channel 112, and be positionable over top tube 224 to engage an anchor disposed adjacent the opposite side of channel 112. Furthermore, while bases 116 and apertures 118 have been described and depicted as generally circular, it will be appreciated that these parts may be any suitable shape.

Figure 4:
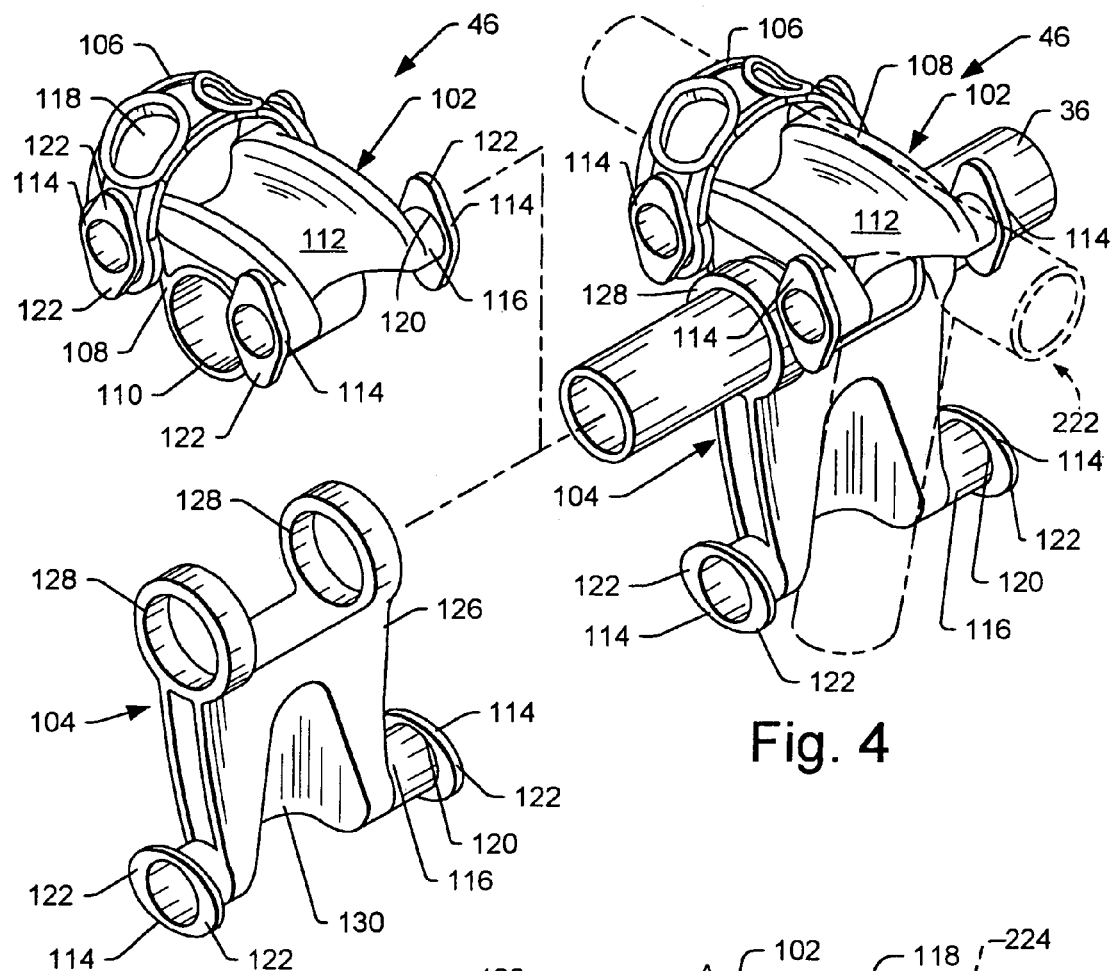
FIG. 4 is an isometric view showing a cradle and a stabilizer installed on a support arm and engaging a portion of a bicycle frame (shown in dashed lines).

While cradles 102 may be configured to retain a bike in a selected longitudinal position on the support arm, it will be appreciated that the bike may tend to swing or sway due to the motion of the vehicle. To protect both the vehicle and bike(s) from damage due to swinging, mounting assembly 46 also may include one or more stabilizers 104 to impede swinging of the bicycle. Each stabilizer may include an integrally formed body 126 with a pair of collars 128 configured to fit over the support arm. As can be seen in FIG. 4, collars 128 may be spaced apart to fit on either side of collar 110 of the cradle when the cradle and stabilizer are mounted together on the support arm. Collars 128 may allow the stabilizer to slide along, and pivot about, the support arm. Because stabilizer 104 is separate from cradle 102, the stabilizer may pivot about the support arm independently of the cradle. While both collars 110 and 128 may be configured to fit on support arm 36 tightly enough to prevent the mounting assembly from accidentally sliding off, the support arm also may include a removable cap (not shown) on the end of the support arm to prevent passage of the collars.

Body 126 may be formed to define a channel 130 extending at least partially into the body, and may be constructed of any suitable material including nylon. The stabilizer may be installed on the support arm so that the channel faces out to the side of the vehicle. The channel may be configured to receive at least a portion of either down tube 226 or seat tube 228. The pivoting connection of stabilizer 104 with support arm 36 may allow the user to selectively position the stabilizer to engage either the seat tube, as shown in FIG. 5, or the down tube, as shown in FIG. 6. When the seat tube or the down tube is received into channel 130, the sides of the channel may prevent lateral swinging of the bicycle frame.

Stabilizer 104 may provide greater stabilizing moment if it engages either the seat tube or the down tube at a location spaced from the top tube. Thus, in the illustrative example, body 126 is approximately four inches long from the top of collars 128 to the bottom of channel 130, and engages the seat tube or the down tube at a location substantially spaced from the top tube of the bicycle. It will be appreciated, however, that the stabilizers may be formed either longer or shorter within the scope of the invention.

Stabilizer 104 also may include one or more anchors 114 configured to engage and secure one or more tie-down members. As shown in the illustrated example, the anchors on the stabilizers may be substantially similar to the anchors on the cradles so that tie-down members 106 may be secured interchangeably to either the cradles or the stabilizers. Alternatively, the anchors on the stabilizers may be configured differently than the anchors on the cradles for compatibility with different tie-down members. Furthermore, as described above in connection with the cradles, the stabilizers may include other configurations of anchors and tie-down members within the scope of the invention.

As shown in FIG. 1, carrier 10 includes three pairs of mounting assemblies for mounting two bicycles. Alternatively, carrier 10 may include only one pair of mounting assemblies for holding one bike, two pairs of mounting assemblies for holding two bikes, or four or more pairs for holding four or more bikes. Furthermore, while each mounting assembly is illustrated as including both a cradle and a stabilizer, it will be appreciated that a single stabilizer per bike may be sufficient to prevent the bike from swinging during travel. Indeed, for bikes with top tubes that are substantially longer than the spacing between the support arms, it may be difficult to engage both the seat tube and the down tube with stabilizers. Thus, in an alternative embodiment, a pair of mounting assemblies may include a first assembly having both a cradle and a stabilizer, and a second assembly having only a cradle. Because the stabilizer may be pivoted to engage either the seat tube or the down tube of a bike, the bike may be mounted facing either the left or the right of the vehicle regardless of which support arm the stabilizer is installed on. Indeed, it may be desirable, when carrying two or more bikes, to mount adjacent bikes facing in opposite directions so that the handlebars of the bikes do not collide. This arrangement may allow more bikes to be carried because they could be placed more closely together.

Although carrier 10 and its components are shown and described in the context of supporting one or more bicycles, the carrier and/or one or more of its components may be used to support one or more cargo items. For example, the carrier may be configured to support skis, snowboards, kayaks, storage containers, etc.

Although the bicycle carrier and features of bicycle carriers have been shown and described with reference to the foregoing operational principles and preferred embodiments, those skilled in the art will find apparent that various changes in form and detail may be made without departing from the spirit and scope of the claims. The present disclosure is intended to embrace all such alternatives, modifications, and variances that fall within the scope of the appended claims.

I claim:

1. A bicycle carrier configured to be mounted to a rear of a vehicle, comprising:
   a first support frame structure including a substantially U-shaped continuous tube having first and second support arms connected to opposite sides of an upper base portion, the support arms having mounting assemblies configured to carry one or more bicycles, the upper base portion having at least one cushion configured for contacting an upper region of the rear of the vehicle;
   a second substantially U-shaped support frame structure, positioned below the first support frame structure relative to the support arms, the second support frame structure having a lower base portion including at least one cushion configured for contacting a lower region of the rear of the vehicle;
   a pair of hub assemblies operatively connecting the first and second support frame structures and permitting selective pivoting of one support frame structure relative to the other frame structure, the support arms defining a first plane, each of the support arms passing through one of the hub assemblies and then having a bend in a direction (a) outward, and (b) downward out of the first plane toward the second support frame structure before merging into the upper base portion; and
   wherein the second support frame structure includes a pair of end portions, each end portion having a linear portion extending from one of the hub assemblies and then having a bend in a direction (a) outward, and (b) backward toward the first support frame structure before merging into the lower base portion.

2. A bicycle carrier configured to be mounted to a rear of a vehicle, comprising:
   a first support frame structure including a substantially U-shaped continuous tube having first and second support arms connected to opposite sides of an upper base portion, the support arms having mounting assemblies configured to carry one or more bicycles, the upper base portion having at least one cushion configured for contacting an upper region of the rear of the vehicle;
   a second substantially U-shaped support frame structure, positioned below the first support frame structure relative to the support arms, the second support frame structure having a lower base portion including at least one cushion configured for contacting a lower region of the rear of the vehicle;
   a pair of hub assemblies operatively connecting the first and second support frame structures and permitting selective pivoting of one support frame structure relative to the other frame structure, the support arms defining a first plane, each of the support arms passing through one of the hub assemblies and then having a bend in a direction (a) outward, and (b) downward out of the first plane toward the second support frame structure before merging into the upper base portion; and
   wherein each of the pair of support arms includes a first pair of the mounting assemblies proximate the at least one hub assembly and a second pair of the mounting assemblies spaced on a distal portion of the support arms away from a proximal portion adjacent the at least one hub assembly, and wherein the distance of the support arms between the first pair of the mounting assemblies is less than the distance of the support arms between the second pair of the mounting assemblies.

3. A bicycle carrier configured for mounting on the rear of a vehicle, comprising
   a first support frame structure including a substantially U-shaped continuous tube having first and second end portions connected to opposite sides of an upper base portion, the end portions having mounting assemblies adapted to cradle one or more bicycles, the upper base portion including an elongate substantially linear middle segment having at least one cushion configured to contact an upper region of the rear of the vehicle, wherein the middle segment is longer than the distance between the end portions;
   a second substantially U-shaped support frame structure including a lower base portion having at least one cushion for contacting a lower region of the rear of the vehicle;
   a pair of hub assemblies operatively connecting the first and second support frame structures and permitting selective pivoting of one support frame structure relative to the other frame structure, wherein the end portions of the first support frame structure frame extending in a parallel orientation, in a first plane, through the hub assemblies, then simultaneously diverge outward and bend downward out of the first plane toward the second support frame structure, then converge inward merging into the middle segment;

wherein the first support frame structure includes flared portions between the upper base portion and the end portions of the first support frame structure that each flare out towards the upper base portion, and downward relative to the end portions of the first support frame structure; and wherein the second support frame structure includes a pair of end portions, each end portion having a linear portion extending from one of the hub assemblies and then having a bend in a direction (a) outward, and (b) backward toward the first support frame structure before merging into the lower base portion.

4. A bicycle carrier configured for mounting on the rear of a vehicle, comprising a lower, substantially U-shaped support structure including a lower base portion having at least one cushion contactable with the rear of the vehicle;

an upper, substantially U-shaped support structure forming first and second arms connected to opposite sides of an upper base portion, the arms having bike mounts for cradling one or more bicycles, the upper base portion including a middle segment having at least one cushion contactable with the rear of the vehicle; and a pair of hub assemblies through which each arm extends, and that operatively connects the upper and lower support structures and permits selective pivoting of one support structure relative to the other, wherein each of the support structures has a pair of linear portions extending in parallel from the hub assemblies in a plane then bending simultaneously (a) outward, and (b) out of the plane toward the base portion of the other support structure; and wherein each arm includes a proximal portion adjacent each hub assembly and a distal portion spaced from the proximal portion, and wherein the distance of the support arms between the proximal portions is greater than the distance of the support arms between the distal portions.

* * * * *